Patented Apr. 27, 1943

2,317,751

UNITED STATES PATENT OFFICE 2,317,751

LUBRICATING OIL

Per K. Frolich and Anthony H. Gleason, Westfield, N. J., assignors to Standard Oil Development Company, a corporation of Delaware No Drawing. Application September 26, 1941, Serial No. 412,434

8 Claims. (Cl. 252—51)

This invention relates to the art of improving lubricating oils, particularly for the purpose of enhancing their viscosity-temperature characteristics, by soluble and stable additives derived through condensation polymerization of selected diamines with properly chosen dibasic acid reactants.

To obtain satisfactory results with a material used as a viscosity index improver, it is considered important that the material be capable of forming a true solution with a hydrocarbon lubricating oil, be capable of raising the viscosity of the oil blend at higher temperatures without unduly raising the viscosity at lower temperatures, and remain substantially unaltered by heat at high temperatures encountered in the use of the oil blend.

It is known that certain diamines and dibasic acids have been used in synthesizing artificial silk fiber-forming resins which are characteristically hard crystalline solids under normal conditions, infusible to a high degree, insoluble in many common organic solvents, and decidedly insoluble in hydrocarbon oils. These fiber-forming resins have a high tensile strength and high chemical stability, but are of no value as blending agents in hydrocarbon lubricating oil base stocks, such as viscous petroleum oils. They have substantially a completely straight chain structure and a high content of nitrogen and oxygen, amounting to about 12% of nitrogen and 14% of oxygen.

In accordance with the present invention, it has been found that appropriate diamines and dibasic acid reactants can be condensed to form branched linear polymers which are normally viscous liquids or amorphous resins having suitable stability, solubility, and viscosity modifying properties to make them useful blending agents for hydrocarbon lubricating oils.

The diamine reactants used in preparing condensation polymers desired in accordance with the present invention are identified by the type formula: (R′)HN—R—NH(R″), wherein R′ and R″ represent hydrogen or univalent hydrocarbon radicals, and R represents a divalent organic group separating the amino groups preferably by at least 6 atoms. The dibasic acid reactant has the type formula: X—R‴—X′, wherein X and X′ represent acid radicals, alike or unalike, but each being capable of reacting with the amino groups in the diamine by condensation to form amide linkages, and R‴ represents a divalent organic group. In each instance, however, it is to be observed that the reactants combined are constituted to form a condensation polymer having a required total hydrogen and carbon content, also, certain structural characteristics.

The diamine and the dibasic acid reactants are condensed under suitable conditions with evolution of water or halogen acid, so that the condensation polymer formed has a long chain of consecutively interlinked units represented as follows:

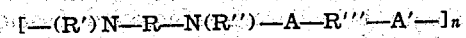

In the above formula given for the recurring unit, A and A′ represent interlinking groups containing the residual acid radicals formed by the condensation.

The resulting condensation polymers are satisfactory for the present purposes provided they have a total hydrogen and carbon content essentially above 80%, preferably from 85% to 90%, and contain in each recurring structural unit a total of 8 to 30 carbon atoms in side chain aliphatic hydrocarbon groups. Accordingly, it is necessary to have either the diamine or the dibasic acid reactant, or both, contain the requisite hydrocarbon side chain groups. The most effective and stable condensation polymer products are obtained when either reactant, preferably the dibasic acid reactant, has an aliphatic hydrocarbon side chain containing 8 to 18 saturated carbon atoms. These factors of total hydrogen and carbon content and side chain hydrocarbon groups are important in avoiding the formation of undesired condensation polymers which are degraded or toughened by prolonged and repeated heating at high temperatures and which are not satisfactorily miscible with a hydrocarbon lubricating oil.

Except for the qualifications indicated, the selection of the reactants can be varied advantageously to permit the use of desired economical materials and to modify the properties of the polymers by incorporating certain inorganic groups containing sulfur, oxygen, nitrogen, phosphorus, or a halogen. For example, a reactive acid radical in the dibasic acid reactant, instead of being a carboxyl radical, may be a sulfonic acid radical (—SO₂·OH), chlor sulfonic acid radical (—SO₂·Cl), acid halide radical (—COCl), thio-acid radical (—COSH), or phosphoric acid radical (—O·PO(OH)·O). Also, the divalent organic groups in the reactants may contain non-reactive substituents or linkages, such as sulfonyl (—SO₂—), ether (—O—), thio-ether (—S—), nitro (—NO₂), etc.

Suitable reactants are synthesized by reacting monoolefindicarboxyl acids e. g., maleic acid $CO_2H \cdot CH:CH \cdot CO_2H$, glutaconitic $$CO_2H \cdot CH:CH \cdot CH_2 \cdot CO_2H$$

or their homologues, with unsaturated hydrocarbons, e. g., octenes, dodecenes, and higher olefins, or their isomers. The resulting addition products may be used as such, or saturated. Suitable branched diamine reactants may be derived from these acids. A number of branched dibasic acid and diamine reactants are synthesized most readily in the form of ethers or thioethers; still others are derived most readily as ketones and sulfones. Other suitable methods may be used in synthesizing any of the desired highly branched reactants, and it will be appreciated that very few of such compounds are obtained directly from natural sources.

In the interest of economy, a suitable highly branched dibasic acid is preferably reacted with an economically procurable diamine, e. g., a straight chain alkylene diamine.

The procedure employed in carrying out the condensation polymerization of the reactants is generally as follows:

The dibasic acid reactant is gradually heated together with an equi-molecular proportion of the diamine reactant to a temperature of about 300° F. to 450° F. to permit condensation without appreciable degradation of the reactants. Either water or halogen acid is evolved in this condensation reaction depending on the nature of the dibasic acid reactant used. The removal of the water or hydrochloric acid by-product from the reaction mixture is facilitated by passing thru the reaction mixture a dry, inert gas, e. g., dry nitrogen, carbon dioxide, or hydrogen, or by carrying out the reaction under a vacuum. After heating the reaction mixture for a sufficient length of time, about 15 to 30 hours, the high molecular weight viscous polymer desired is formed. The polymers in this product should have molecular weights ranging preferably from 5,000 to 30,000. In the early stages of the reaction, the product may have the form of a mobile oil, and by further reaction, the polymer product becomes more viscous up to a certain degree but does not set or harden. The properly prepared polymer product, even after heating for a prolonged period of several days at an elevated temperature, characteristically retains a liquid or amorphous resin form.

Following the general procedure outlined, condensation polymers were prepared from iso-dodecenyl succinic acid, $$HOOC-CH(C_{12}H_{23})-CH_2-COOH,$$

and from decamethylene diamine, $$H_2N-(CH_2)_{10}-NH_2,$$

28 parts by weight of the acid being heated together with 48 parts by weight of the diamine gradually to 410° F. while the reaction mixture was blown with dry hydrogen. After heating the reaction mixture for over 24 hours, the polymer attained a consistency of a viscous liquid, and remained in this form when heated for several days at the same temperature.

In the manner described, desirable non-hardening condensation polymers of high molecular weight and good hydrocarbon oil solubility are formed by reacting iso-dodecenyl succinic acid, or its higher homologues with other suitable diamines, e. g., paradi(aminomethyl)benzene, $NH_2CH_2C_6H_4CH_2NH_2$, amino-hexyl ether, $$[NH_2(CH_2)_6]_2O,$$

1,12-diamino octadecane, $$NH_2(CH_2)_{11}CHNH(C_6H_{13}),$$

di(aminooctyl) sulfone, $[NH_2(CH_2)_8]_2SO_2$, aminohexyl thioether $[NH_2(CH_2)_6]_2S$.

By using a diamine reactant of relatively high molecular weight and containing a substantial number of carbon atoms in a branched aliphatic hydrocarbon group, e. g., 1,12-diamino octadecane, the choice of qualified dibasic reactants is increased. For example, this kind of diamine reacted in a mol to mol proportion with isobutyl sebacic acid chloride at a temperature of 420–440° F., dry nitrogen being blown thru the reaction mixture, yields a desired viscid but nonhardening condensation polymer. Another specific example of a suitable dibasic acid reactant to be used with this kind of diamine is carboxyl-isopropyl-lauric sulfonic acid.

Likewise, with the use of relatively high molecular weight dibasic acid reactants which are also highly branched, e. g., octa-decyl ethyl disulfonic acid, $HSO_3 \cdot CH_2 \cdot CH(C_{18}H_{37}) \cdot SO_3H$, an expansion is made in the variety of dibasic acid reactants and complementary diamine reactants which are qualified for reaction therewith to form the non-hardening polymers characterized by total hydrogen and carbon contents above 80% and branched hydrocarbon radicals having a total of at least 8 carbon atoms in each recurring unit. In these high molecular weight dibasic acid reactants, one of the acid radicals may be a carboxyl group, a chlorsulfonic acid radical, or a partially esterified phosphoric acid radical which retains a reactive hydrogen atom. The diamine reactant may be hexamethylene diamine, a higher alkylene diamine, or a substituted aliphatic diamine derivative, e. g., the diamino derivative of tri-ethylene glycol, $$NH_2(CH_2)_2O(CH_2)_2O(CH_2)_2NH_2.$$

The condensation polymer products obtained in accordance with the foregoing examples are satisfactorily miscible with petroleum oils of the type used as lubricating oils, and when blended with these oils in proportions ranging from about ½% to 10% by weight, they exhibit thickening and viscosity improving effects. These condensation polymers may be added as blending agents in minor proportions to insulating oils, industrial oils, and greases, as well as lubricating oils. They may be blended with hydrocarbon oils that are paraffinic, naphthenic, or aromatic in nature; hence, with oils from various crude base stocks which have been subjected to conventional methods of refining or with oils prepared synthetically.

Other materials, such as pour point depressants, oxidation inhibitors, dyes, oiliness agents, sludge dispersing agents, etc., may be used along with these condensation polymers in the hydrocarbon oil compositions.

Although a number of examples have been given, is is not intended that the invention be limited thereto, for a variety of different embodiments of this invention may be made without departing from the spirit and scope thereof as defined in the appended claims.

We claim:

1. An improved lubricating oil composition comprising a viscous hydrocarbon oil containing a minor proportion of a high molecular weight condensation polymer of an organic diamine and a dibasic organic acid, said polymer having a branched long chain structure of interlinked recurring units each of which contains at least 8 carbon atoms in branched side chain hydrocarbon groups, said polymer being further characterized by having a total hydrogen and carbon content above 80%.

2. An improved lubricating oil composition comprising a viscous hydrocarbon oil containing a small proportion of a soluble condensation polymer of an organic straight chain diamine having reactive amino radicals separated by a series of at least 6 atoms and a dibasic organic acid having an aliphatic hydrocarbon side chain containing at least 8 carbon atoms, said polymer having a total hydrogen and carbon content above 80%, a molecular weight in the range of 5,000 to 30,000, and being normally a viscous liquid which is not hardened by prolonged heating at elevated temperatures.

3. An improved lubricating oil composition comprising a viscous hydrocarbon oil containing in solution ½% to 10% by weight of a high molecular weight condensation polymer of the reactants decamethylene diamine and isododecenyl succinic acid, said polymer having a total hydrogen and carbon content above 80%.

4. An improved lubricating oil composition comprising a viscous hydrocarbon oil containing in solution a small proportion of a non-hardening polymer of a branched chain organic diamine condensed with a dibasic organic acid, said polymer having a total hydrogen and carbon content above 80% and having a branched long chain structure composed of recurring units, each of which contains a total of at least 8 carbon atoms in aliphatic hydrocarbon side chain groups.

5. An improved lubricating oil composition comprising a viscous hydrocarbon oil containing in solution about ½% to 10% by weight of a non-hardening condensation polymer of 1,12-diamino octadecane and isobutyl sebacic acid chloride, said polymer having a molecular weight in the range of 5,000 to 30,000.

6. An improved lubricating oil composition comprising a viscous hydrocarbon oil containing in solution a minor proportion of a non-hardening condensation polymer of an organic diamine wherein reactive amino radicals are interlinked thru a series of at least 6 atoms and a branched dibasic organic acid having at least 8 carbon atoms in aliphatic side chain hydrocarbon groups, said polymer having a total hydrogen and carbon content of from 85% to 90% and being characteristically an amorphous resin which is not hardened by prolonged heating at elevated temperatures.

7. An improved lubricating oil composition as described in claim 6 in which an acid radical of said dibasic organic acid is a sulfonic acid radical.

8. An improved lubricating oil composition as described in claim 6 in which said dibasic organic acid is octadecyl ethyl disulfonic acid.

PER K. FROLICH.
ANTHONY H. GLEASON.